(12) United States Patent
Hirneise

(10) Patent No.: US 9,988,832 B2
(45) Date of Patent: Jun. 5, 2018

(54) MODULAR VEHICLE DOOR

(71) Applicant: Paul Hirneise, Gainesville, FL (US)

(72) Inventor: Paul Hirneise, Gainesville, FL (US)

( * ) Notice: Subject to any disclaimer, the term of this patent is extended or adjusted under 35 U.S.C. 154(b) by 0 days. days.

(21) Appl. No.: 15/597,214

(22) Filed: May 17, 2017

(65) Prior Publication Data

US 2017/0335609 A1  Nov. 23, 2017

Related U.S. Application Data

(60) Provisional application No. 62/339,164, filed on May 20, 2016.

(51) Int. Cl.
| | | |
|---|---|---|
| *B60J 5/00* | (2006.01) | |
| *E05D 1/02* | (2006.01) | |
| *B60J 1/20* | (2006.01) | |
| *B60J 5/04* | (2006.01) | |
| *E05D 7/06* | (2006.01) | |
| *E05D 5/02* | (2006.01) | |

(52) U.S. Cl.
CPC .............. *E05D 1/02* (2013.01); *B60J 1/20* (2013.01); *B60J 5/047* (2013.01); *E05D 5/0207* (2013.01); *E05D 7/06* (2013.01); *E05Y 2900/531* (2013.01)

(58) Field of Classification Search
CPC ........... E05D 1/02; E05D 5/0207; E05D 7/06; E05D 2900/531; B60J 1/20; B60J 5/0207; B60J 5/047
See application file for complete search history.

(56) References Cited

U.S. PATENT DOCUMENTS

| | | | | |
|---|---|---|---|---|
| 2,494,001 A * | 1/1950 | Rowe | .................... | E05D 15/165 16/223 |
| 4,217,970 A * | 8/1980 | Chika | .................. | B60G 21/055 180/298 |
| 4,336,964 A * | 6/1982 | Pivar | ...................... | B60J 5/0487 180/210 |
| 5,058,863 A * | 10/1991 | Maffet | .................. | E04B 2/7431 160/135 |
| 5,094,313 A * | 3/1992 | Mauws | .................. | B62D 21/08 180/210 |
| 6,547,304 B1 * | 4/2003 | Conner | ...................... | B60J 7/08 280/DIG. 5 |
| 9,428,227 B2 * | 8/2016 | Jones | .................... | B62D 23/005 |
| 2003/0150769 A1 * | 8/2003 | Lau | ...................... | B65D 88/005 206/600 |
| 2006/0254024 A1 * | 11/2006 | Yong | .................. | A47G 29/1201 16/270 |
| 2009/0260185 A1 * | 10/2009 | Conner | .................. | E05B 83/10 16/251 |
| 2011/0047754 A1 * | 3/2011 | Takahashi | .............. | G06F 1/1681 16/342 |
| 2013/0199097 A1 * | 8/2013 | Spindler | .................. | B60J 5/047 49/394 |
| 2014/0174284 A1 * | 6/2014 | Peters | ........................ | F41H 5/24 89/36.02 |

* cited by examiner

*Primary Examiner* — Lori L Lyjak
(74) *Attorney, Agent, or Firm* — Sven W. Hanson

(57) ABSTRACT

A modular door assembly is adapted for installation on existing open frame vehicles formed of tubular members. A novel tubular hinge construction provides support for the door assembly while allowing rotational movement of the door in use. Alternative vehicle elements may also be secured to and operable on the novel hinge.

5 Claims, 6 Drawing Sheets

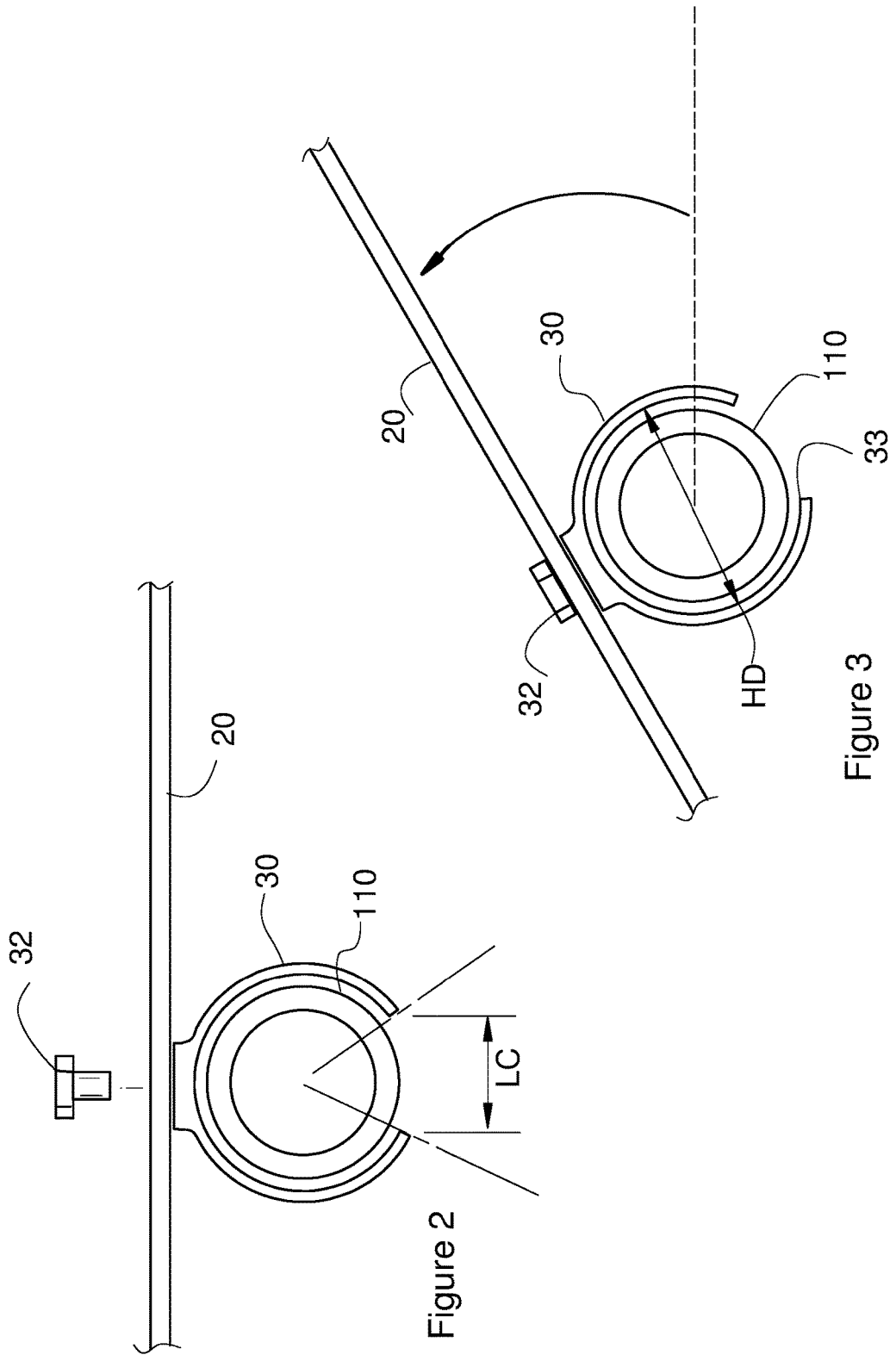

MODULAR VEHICLE DOOR

BACKGROUND

The invention pertains to modular doors and similar access panels intended to be secured, or secured to, previously assembled personal vehicles such as automobiles. The design and configuration of available personal vehicles are currently changing. There are a number of vehicles that combine elements of motorcycles and other "open" cockpit vehicles with the concept of the closed compartment automobile. Some of these include an open frame construction using tubular structural members to form an open cockpit configuration but with conventional seats. However, in many cases, there is a need to provide additional containment, such as doors or similar access elements. What is desired is a design and mechanism to secure moveable door elements to an open frame construction vehicle body.

SUMMARY OF THE INVENTION

The invention includes a door assembly and a securing mechanism that provides a rigid support for a vehicle door while enabling convenient rotational movement of the door during use by a passenger of the associated vehicle. The securing mechanism includes a flexible hinge formed of a flexible slotted tube configured to be retained on a vehicle tubular structural member without interconnecting fasteners or other joining mechanisms.

In other configurations of the invention, the same hinge tube element is used to support other functional elements of the vehicle such as a wind diverter. In various embodiments, the invention includes a kit or system including alternatively interchangable functional elements including a door assembly and others that may be secured in like manner to a novel hinge tube. In various configurations, a vehicle according to the invention may include multiple hinge tubes located on different tubular structures of the vehicle, each configured to receive one or more functional elements.

Other novel aspects of the invention are made apparent in the following description of specific embodiments of the invention and the associated figures. The scope of the invention is intended to be defined by the accompanying claims.

DESCRIPTION OF THE DRAWINGS

FIGS. 2 and 3 are detailed end views of the components of the inventive door.

DETAILS OF EMBODIMENTS OF THE INVENTION

Figure 1:
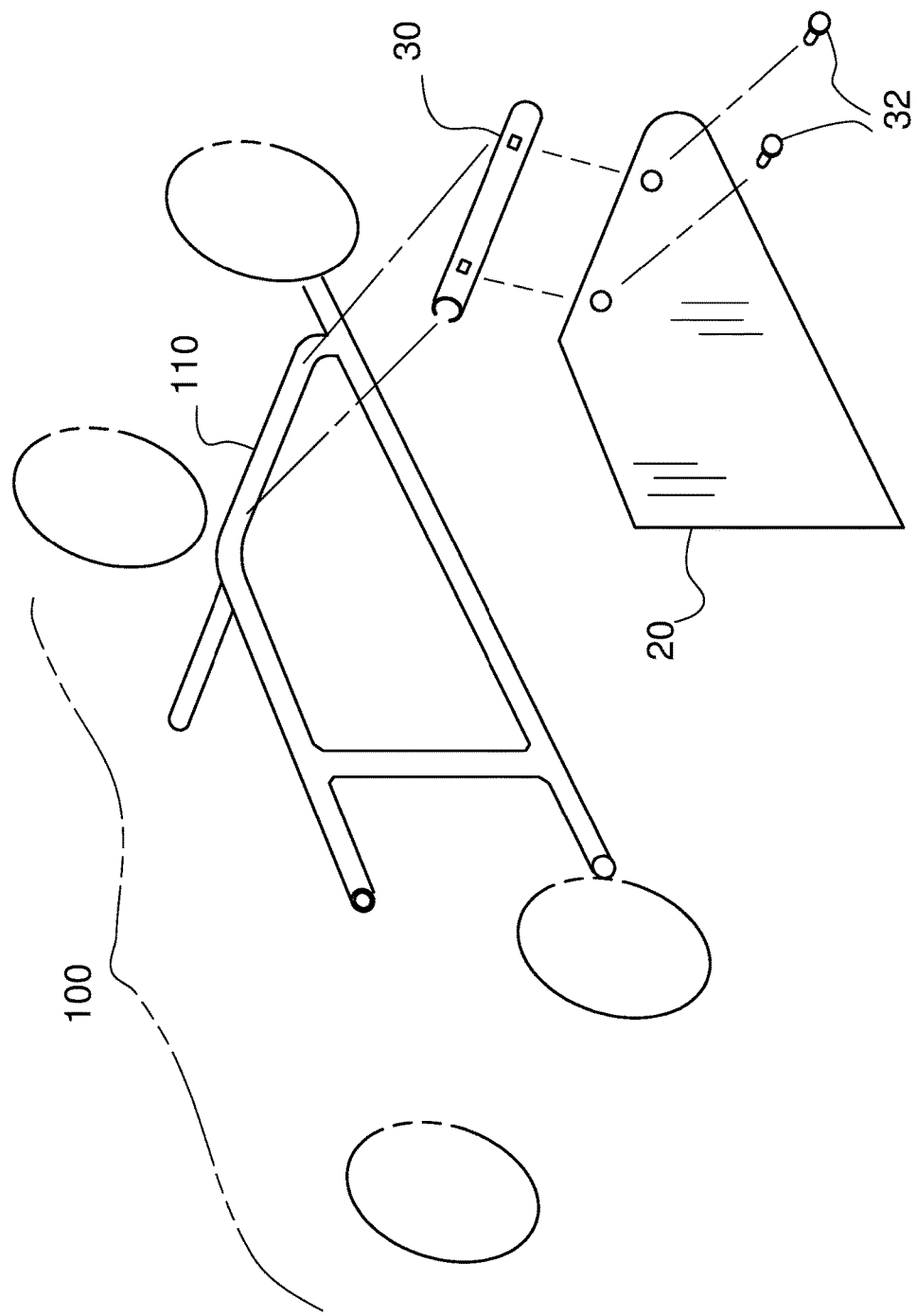
FIG. 1 is a perspective view of a vehicle door system according to the invention in association with a vehicle for mounting.

FIG. 1 is a perspective view of the inventive door system. A vehicle body 100 is shown in part including a vehicle user opening. A door assembly 20 is configured to effective cover and close the vehicle opening. The body 100 is formed, in part, by structural members formed of tubular sections 110. This form of construction is essential for operation of the invention as desired. A door assembly 20 is secured to the body 100 by way of a cylindrically shaped hinge tube 30. Conventional fasteners 32 are used to secure the door assembly 20 to the hinge tube 30. Preferably the fasteners 32 are configured to be alternatively secured and removed without the use of tools. The hinge tube 30 is in turn pivotably secured to a tubular section 110. By proper selection of size and material of the hinge tube 30, the hinge tube 30 can support the door assembly in a number of different rigid configurations—by rotating the hinge tube 30 and door assembly, together, about the associated tubular section 110.

FIGS. 2 and 3 are end section views of the door assembly 20 with a secured hinge tube 30 supported on a tubular section 110. The inner diameter dimension HD of the hinge tube 30, separate from the tubular section 110, is slightly smaller (in the prejoined unstressed state) than the outer diameter of the tubular section 110. Expressed in other terms, the tubular section 110 resides in the hinge tube 30 with an interference fit such that the larger diameter of the tubular section 110 maintains an outward displacement of the hinge tube 30 thereby induces stress in the hinge tube 30 and reacting force against the surface of the tubular section 110. In the figure, a gap between these elements is shown only for clarity of illustration of the respective elements. The hinge tube 30 is formed of a flexible resilient material, such that when the hinge tube 30 is in place on the tubular section 110, the hinge tube 30 is biased continuously into a more closed (smaller diameter) condition, such as to maintain a forced contact and consequent friction with the tubular section 110. To enable this while also ensuring that relative rotation between these elements is still possible, the hinge tube 30 is formed of a flexible non-metallic material. Preferably, the hinge tube is formed of unfilled ABS (substantially acrylonitrile-butadiene-styrene) plastic having flexural and tensile modulai of about 300,000 psi (pounds per square inch) or greater. A high modulas is required to provide the necessary rigidity of the open form of the hinge when in place. ABS plastic materials may also include other compounds such as colorantes. The tube shape may be formed by conventional methods such as heat forming. Receptors for retaining male fastening elements, such as standard threaded nuts, are formed integral with the hinge tube 30 to mate with the fasteners 32. The desired function of the hinge tube 30 requires that no fasteners or fastening mechanism join or connect the hinge tube and the vehicle tubular section 110. That is, at all times, these two elements have a sliding interrelationship that allows the rotational movement of the hinge tube 30.

Because the inventive system is designed for use on existing vehicles, the appropriate tubular body section for securing the door assembly is most likely found without an free end. For this reason, the hinge tube 30 must be configured to engage the tubular section 110 laterally, by forcing the tubular section 110 through a longitudinal slot 33 in the hinge tube 30. The slot 33 must must have a width dimension LC sufficient so that, together with the resilient flexibility of the hinge tube 30 material and construction, the slot 33 may be forced to a large width to allow passage therethrough of the tubular section 110. At the same time. The slot 33 must be small enough that, together with the rigidity and strength of the hinge tube 30 construction, the hinge tube once installed over the tubular section 110 provides a secure attachment for the door assembly 20. The particulars of these design elements may depend on the diameter of the tubular section 110 and the weight of the door assembly 20.

It is suggested that engagement of the hinge tube 30 with the tubular section 110 be initiated by forcing the tubular section 110 through one end of the slot 33, enlarging then end the slot 33 as required (allowing the remaining portions of the slot to narrow in reaction). The tubular section 110 may then be gradually pushed into and through the remaining length of slot 33 with reduced maximum force.

Once engaged with the tubular section 110, the biasing force of hinge tube 30 to close onto the tubular section 110 provides a friction force resisting rotation of the hinge tube 30 on the tubular section 110. This static friction force is preferably greater than the resulting torque force of the door assembly when at all use positions. In this manner, external or secondary supports for the door assembly is not necessary. For this requirement, the hinge tube 30 must have sufficient longitudinal length.

Figure 4:
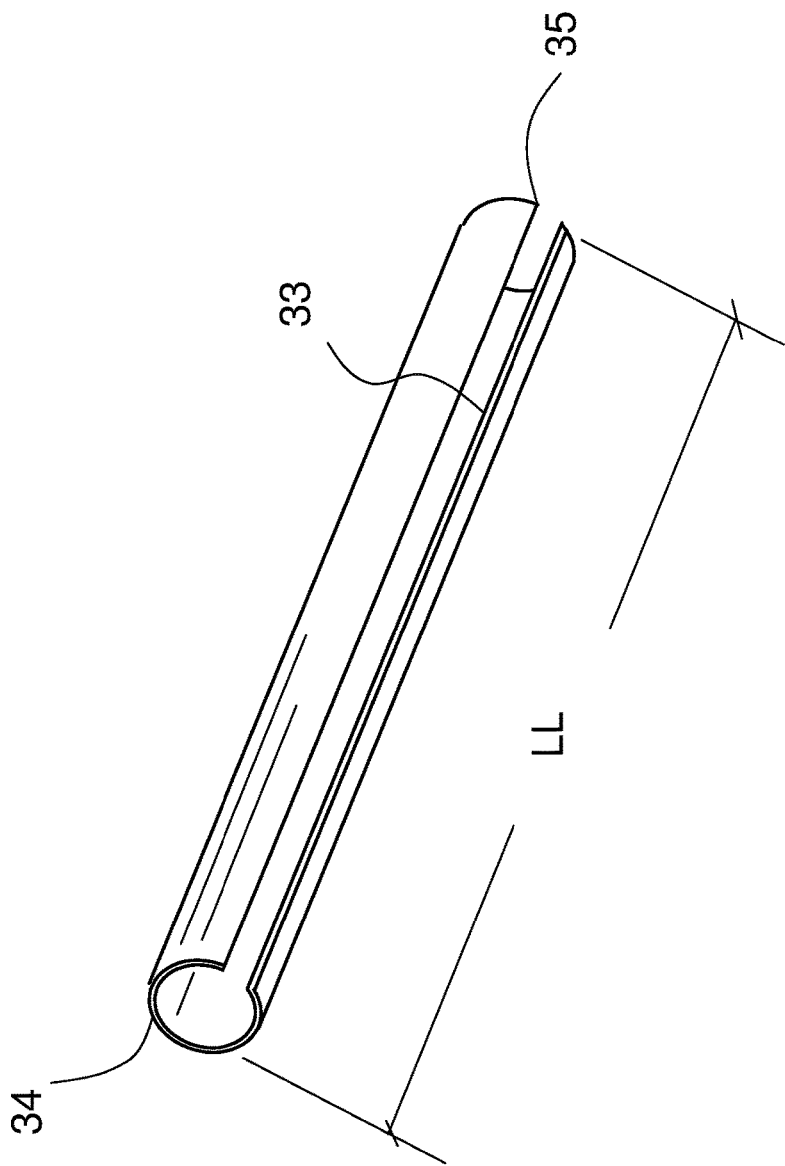
FIG. 4 is a detailed perspective view of the hinge tube element of the invention.

FIG. 4 is a detailed perspective view of the hinge tube 30. To provide sufficient stiffness and strength the hinge tube 30 is suggested to be formed of ABS sheet having a thickness sufficient to provide general gross rigidity. The slot 33 extends the entire length LL between the opposing ends 34, 35 of the hinge tube 30.

Figure 5:
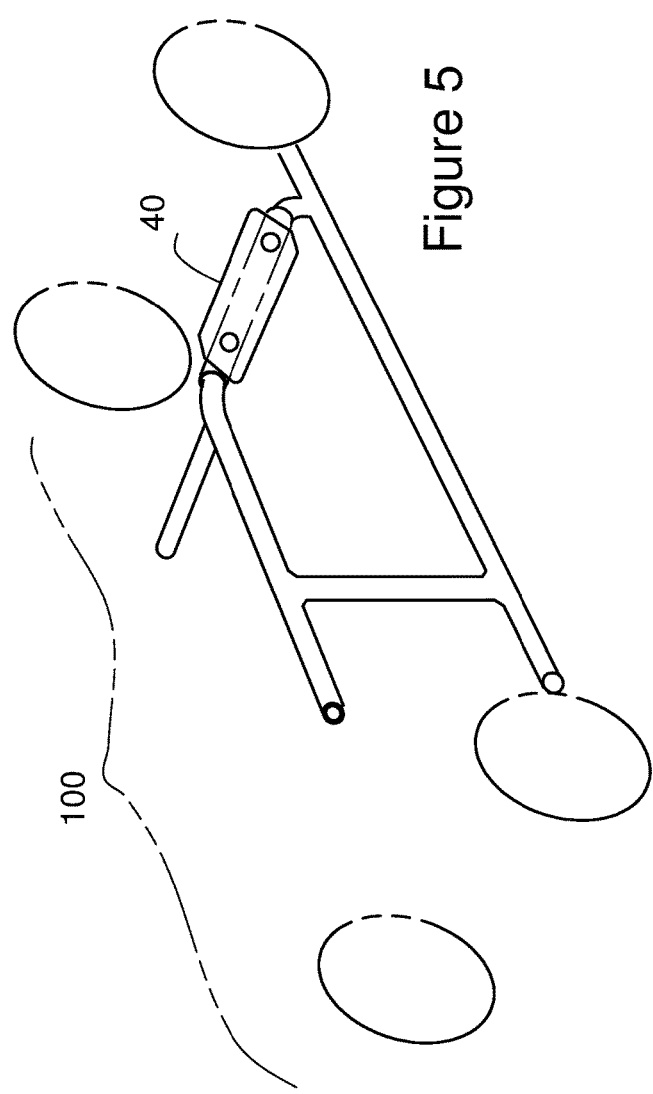
FIG. 5 is a perspective view of a further embodiment of the invention including a wind diverter.
Figure 6:
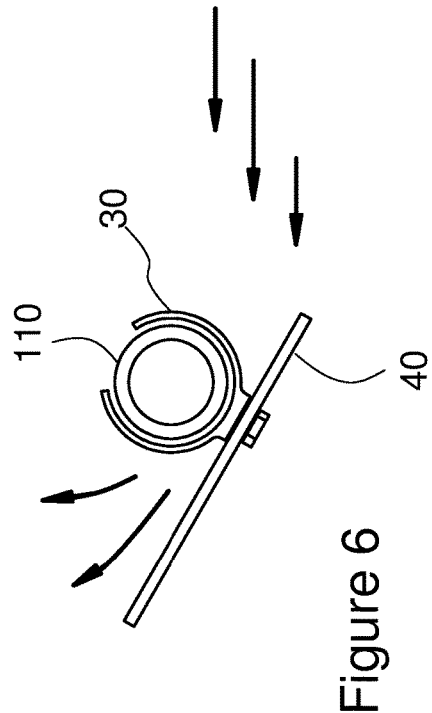
FIG. 6 is a detailed view of the embodiment of FIG. 5.

FIG. 5 illustrates a second vehicle component, namely a wind diverter 40 configured to be supported on the hinge tube 30 and there operable for various different functions. The diverter 40 is sized substantially smaller in size—smaller than the door assembly 20 and the associated vehicle door opening. The diverter 40 is preferably a rigid flat structure. The specific size and shape of the diverter 40 is not critical but may be altered as desired to carry out the desired function in association with the respective vehicle. Generally, the diverter 40 is designed to direct flowing air, during normal travel of the vehicle body 100, away or into the passenger compartment. FIG. 6 is an enlarged view of the diverter 40 of FIG. 5 illustrating the relative flow of air during use.

Figure 7:
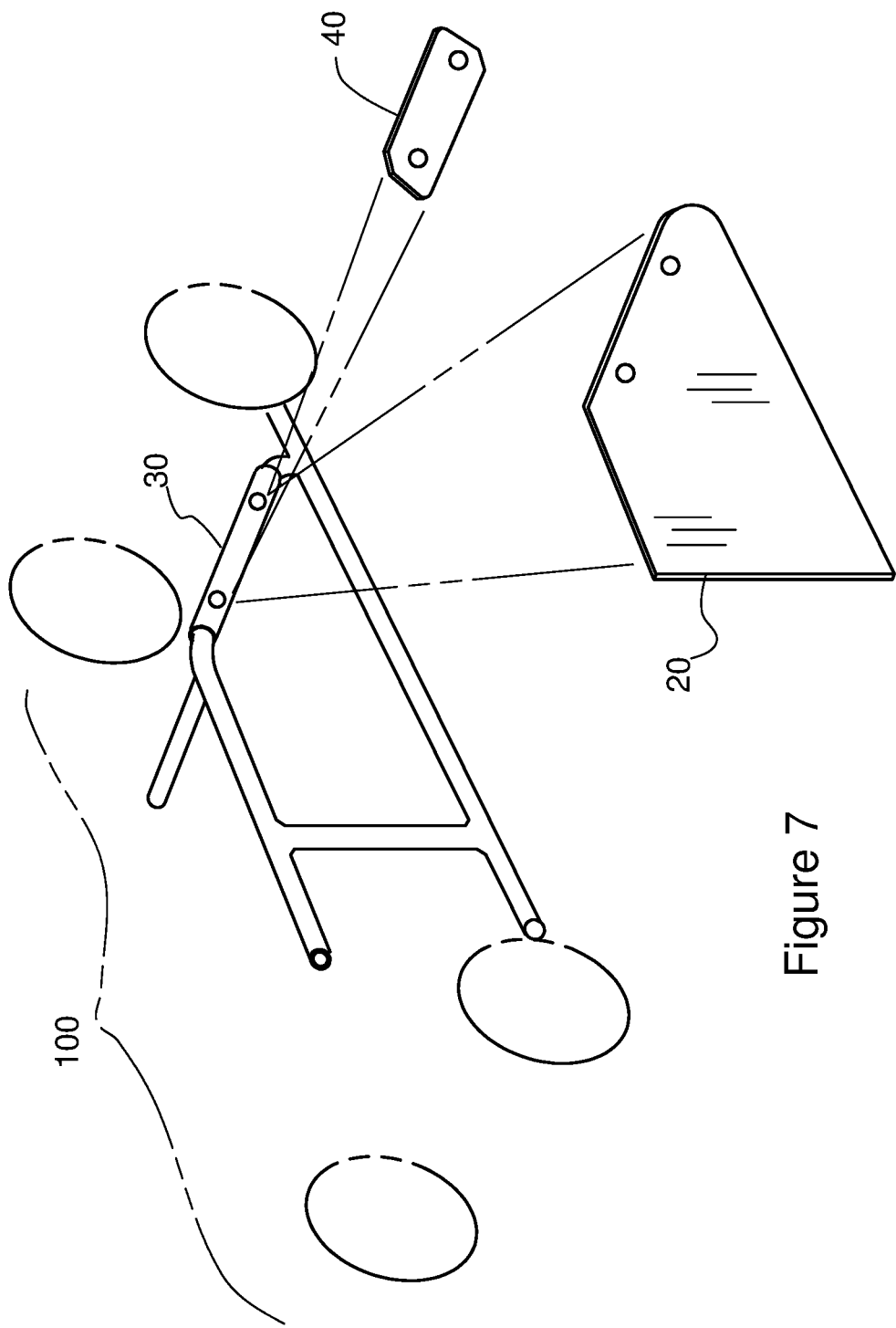
FIG. 7 illustrated alternative elements of the invention.

FIG. 7 assembly or kit of multiple functional elements each supportable and operable on a single hinge tube 30. In this embodiment, both a wind diverter 40 and a door assembly 20 are provided and configured to be interchangeably secured to and operated on the hinge tube 30.

Figure 8:
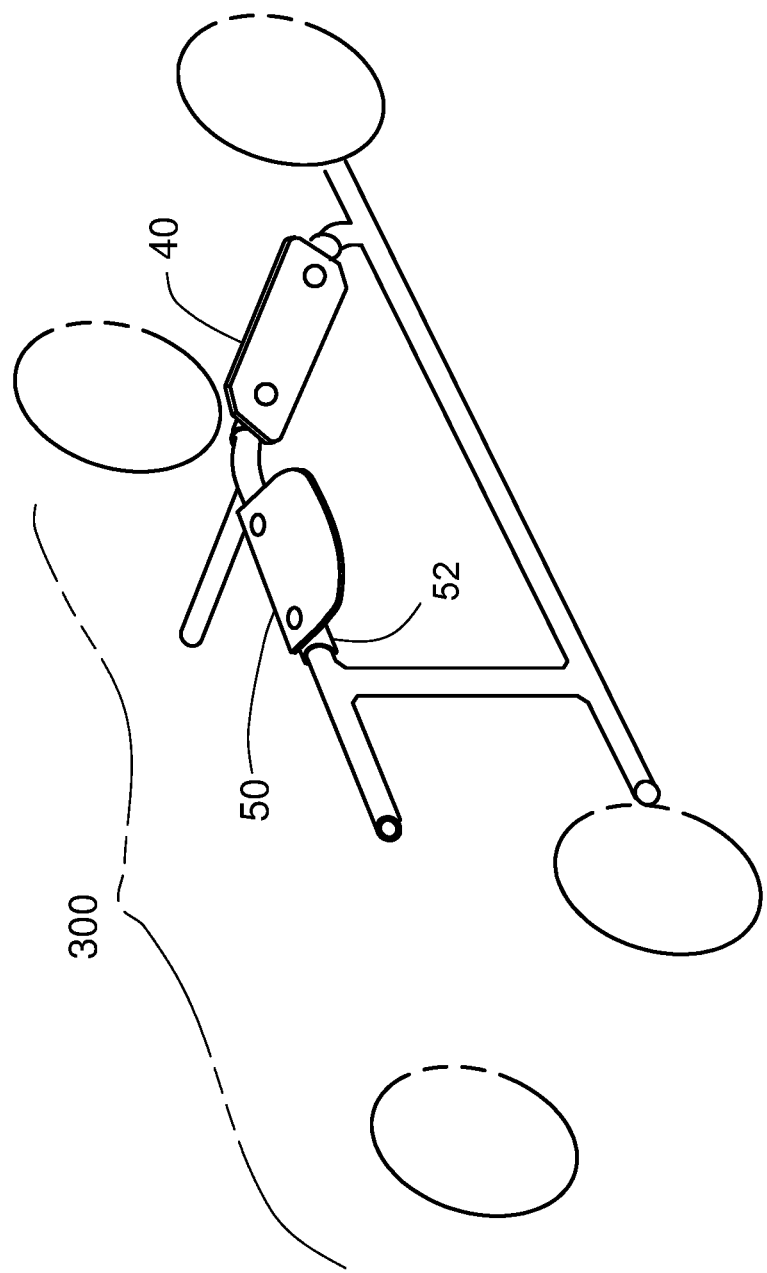
FIG. 8 is a perspective view of multiple functional elements secured to a vehicle in an alternative embodiment of the invention.

FIG. 8 illustrates a vehicle 300 including multiple functional elements, each supported on a respective hinge tube 30. In this embodiment a second hinge tube 52 is positioned on a distinct hinge tubular element of the vehicle. The second hinge tube 52 supports a second functional element 50, in this case a sun shade that may be rotated by the user during use to alter its effect. The construction of the second hinge tube 52 and the manner of securing and operating the second functional element 50 is the same as described above respecting the hinge tube. The advantages of alternative removal of the second functional element 50 and its rotational adjustment and operation is provided in the same way by the novel aspect of the second hinge tube 52. Examples of functional elements adaptable to the invention include a rigid flat thin blade configured as a sun shade.

The above description is that of current embodiments of the invention. Various alterations and changes can be made without departing from the spirit and broader aspects of the invention as defined in the appended claims. For example, while herein the door assembly 20 is illustrated as a simple panel panel, the door element may take any of a great number of different configurations, both conventional, novel and future. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to elements in the singular, for example, using the articles "a," "an," "the" or "said," is not to be construed as limiting the element to the singular.

The invention claimed is:

1. A system for pivotally connecting a door assembly to straight tubular members of a vehicle frame, the system comprising:
   a door panel;
   a tubular hinge removably secured to the door panel;
   the hinge comprising resilient walls and having two terminal ends and an open slot extending between the ends;
   such that a tubular member of a vehicle frame may be moved through the connector slot by biasing the connector walls outward to position the connector around the tubular member and subsequently securing the door panel to the connector, whereby the door panel may be simultaneously retained on and rotated about the tubular member.

2. The system according to claim 1 and further comprising:
   a wind diverter, the wind diverter configured to be secured to the hinge.

3. A vehicle comprising:
   a body having multiple rigid tubular members;
   at least one hinge tube, each hinge tube rotatably disposed on a respective one of the multiple tubular members without interconnecting mechanisms;
   a door removably secured to the hinge tube.

4. The vehicle according to claim 3 and further comprising:
   a wind diverter;
   the door and wind diverter configured to be interchangeably secured to the hinge tube.

5. The vehicle according to claim 4 and wherein:
   the at least first hinge tube comprises a first hinge and a second hinge;
   the wind diverter secured to the first hinge and a vehicle functional element secured to the second hinge.

\* \* \* \* \*